(12) United States Patent
Yang

(10) Patent No.: US 7,862,168 B1
(45) Date of Patent: Jan. 4, 2011

(54) EYEGLASS HOLDING DEVICE

(76) Inventor: Tayhugh Yang, 4009 Calle Sonora Oeste, Unit #1F, Laguna Woods, CA (US) 92637

( * ) Notice: Subject to any disclaimer, the term of this patent is extended or adjusted under 35 U.S.C. 154(b) by 0 days.

(21) Appl. No.: 12/638,670

(22) Filed: Dec. 15, 2009

(51) Int. Cl.
 *G02C 5/14* (2006.01)
(52) U.S. Cl. .................................................... 351/123
(58) Field of Classification Search .................. 351/41, 351/111, 122, 123
 See application file for complete search history.

(56) References Cited

U.S. PATENT DOCUMENTS

| 7,559,647 | B2 * | 7/2009 | Curiel ........................ 351/158 |
| 2004/0017540 | A1 * | 1/2004 | Matera ........................ 351/91 |

OTHER PUBLICATIONS

Eyewear Retainers. Sun Glass Straps, Neoprene Straps, Belts, Lanyards, KeyRings . . . Croakies. Mar. 16, 2010. <http://www.croakies.com> 2 pages.
VisionRX Professional Vision Test Software. Eyeglass Frames. Nov. 3, 2009. <http:www.visionrx.com/Library/enc/enc_eyeframes.asp> 4 pages.
Brady Medical Terminology. Part II: The Ear. Copyright 1997. Prentice-Hall, Inc. pp. 358-359.

* cited by examiner

*Primary Examiner*—Huy K Mai
(74) *Attorney, Agent, or Firm*—Stetina Brunda Garred & Brucker

(57) ABSTRACT

Left and right curved discs may be attached to distal end portions of the left and right temple frames of an eyeglass. The left and right curved discs are positionable at a slight depression covered by skin above a mastoid process of the wearer's head and behind the wearer's ears for securing the eyeglass to the wearer. When not in use, the left and right curved discs may be hooked onto the wearer's ears for temporarily storing the eyeglass.

10 Claims, 4 Drawing Sheets

EYEGLASS HOLDING DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to an eyeglass.

Eyeglasses are widely worn for vision correction in near-sighted (myopia) persons, far-sighted (hyperopia) persons, persons with middle-age reading problem (presbyopia) or persons with light-sensitive eyes (photophobia). For each of these situations, the person wearing the eyeglass repetitively wear and take off the eyeglasses. Unfortunately, repetitively wearing and taking off the eyeglass may be cumbersome. As such, many individuals may choose to not wear the eyeglass even if needed. Accordingly, there is a need in the art for a convenient method and device for wearing and storing the eyeglass.

For eyeglass wearers that participate in physical activities (e.g., jogging, biking, etc.), prior art eyeglasses are not typically designed for secure attachment to the wearer's head despite physical movement as required by the physical activity. As a workaround, elastic bands are attached to distal end portions of the eyeglass temple frames and wrapped behind the wearer's head to secure the eyeglass to the wearer's face. Unfortunately, once the elastic band is wrapped behind the wearer's head, it is cumbersome to repetitively takeoff and put the eyeglass back on. Also, pressure from the elastic band may irritate the wearer. Other types of bands are also available. By way of example and not limitation, non-elastic straps that attach to distal end portions of the eyeglass temple frames are available. The straps allow the person to hang the eyeglass around the person's neck when the eyeglass is not in use. Unfortunately, such non-elastic bands may not secure the eyeglass to the wearer's head.

Far sighted individuals may use reading glasses to read a newspaper, book, etc. However, when a friend or companion interrupts his/her reading, the individual typically removes the reading glass to face the other person instead of peering over the top of the reading glass lenses. Non elastic straps may be attached to the reading glass so that the individual may hang the reading glass about his/her neck. Unfortunately, the non elastic strap may contact the back of the individual's neck during reading so as to irritate the individual.

Near sighted individuals also take off their glasses when they need to apply facial lotion or wash his/her face. Accordingly, individuals that wear eyeglasses repetitively take off and put the eyeglasses back on for various reasons throughout the day. Storing the eyeglass in a case or a shirt pocket is inconvenient.

Accordingly, there is a need in the art for a method and device that allows a person to conveniently and easily store the eyeglass temporarily and secure the eyeglass to the wearer's face during increased physical activity.

BRIEF SUMMARY

The eyeglass hanging device disclosed herein addresses the needs discussed above, discussed below and those that are known in the art.

The eyeglass may have a pair of lenses with temple frames that extend rearwardly and hook over the wearer's ears. Distal end portions of the eyeglass temple frames may have dome shaped round discs that may be positioned within a slight depression located behind the wearer's ears and above a mastoid process of the wearer's head. The discs may be manufactured from a non slip material. When the non slippery round discs are disposed within the slight depression, it provides additional securement of the eyeglass to the wearer's head such that the wearer may now engage in physical activity that the wearer could not with prior art eyeglasses. Sometimes when the eyeglass needs to be temporarily stored such as during application of facial lotion or washing a person's face, the wearer may hook the round disc within bowls of the wearer's ears. As such, the non slippery round discs allow the person to have secure attachment of the eyeglass to the wearer's face during use of the eyeglass and participation of a physical sport. Additionally, when the eyeglass is not needed, the wearer may hook the round disc on the wearer's ears to temporarily store the eyeglass.

More particularly, an eyeglass for secure attachment to a wearer's head is disclosed. The eyeglass may comprise a lens, left and right temple frames and left and right curved discs. The lens protect eyes of the wearer or improves the wearer's vision. The left and right temple frames may be attached to opposed sides of the lens. The left and right temple frames may extend rearwardly and be disposable between the ear and a skull of the wearer. The left and right curved discs may be attached to distal end portions of the left and right temple frames. The left and right curved discs may be positioned at a slight depression covered by skin above a mastoid process of the wearer's head and behind the wearer's ear for securing the eyeglass to the wearer's head.

The outer peripheries of the curved discs may be round. The curved discs may have a lateral dome shape and a medial flat surface. The outer peripheries of the curved discs may be lined up to upper edges of the distal end portions of the left and right temple frames.

The eyeglass may further comprise left and right slip-on temple frame ends. The left and right curved discs may be formed as a unitary part of the slip-on temple frame ends.

Additionally, a method of adjusting an eyeglass to a wearer is disclosed. The method may comprise the steps of providing the eyeglass wherein the eyeglass may have a lens for protecting eyes of a wearer or improving vision of the wearer; left and right temple frames attached to opposed sides of the lens, the left and right arms extending rearwardly and disposable between the ear and a skull of the wearer; and left and right curved discs attached to distal end portions of the left and right temple frames. The method may further comprise the steps of disposing the eyeglass on a head of the wearer; and bending the left and right temple frames until the left and right curved discs are positioned at a slight depression covered by skin above a mastoid process of the wearer's head and behind the wearer's ear.

The providing step may further comprise the step of attaching temple frame tips with unitary left and right curved discs to the distal end portions of the left and right temple frames. Alternatively, the providing step may further comprise the step of attaching slip on ends with left and right curved discs to the left and right temple frame tips.

Additionally, a method of securing an eyeglass to a head of a wearer when the eyeglass is not in use is disclosed. The method may comprise the steps of providing the eyeglass wherein the eyeglass may have a lens for protecting eyes of a wearer or improving vision of the wearer; left and right temple frames attached to opposed sides of the lens, the left and right arms extending rearwardly and disposable between the ear and a skull of the wearer; and left and right curved discs attached to distal end portions of the left and right temple frames. The method may further comprise the step of disposing the left and right curved discs within bowls of left and right ears of the wearer. The method may further comprise the step of sliding the left and right curved discs within the bowls of the left and right ears of the wearer as the wearer leans forward and backward.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
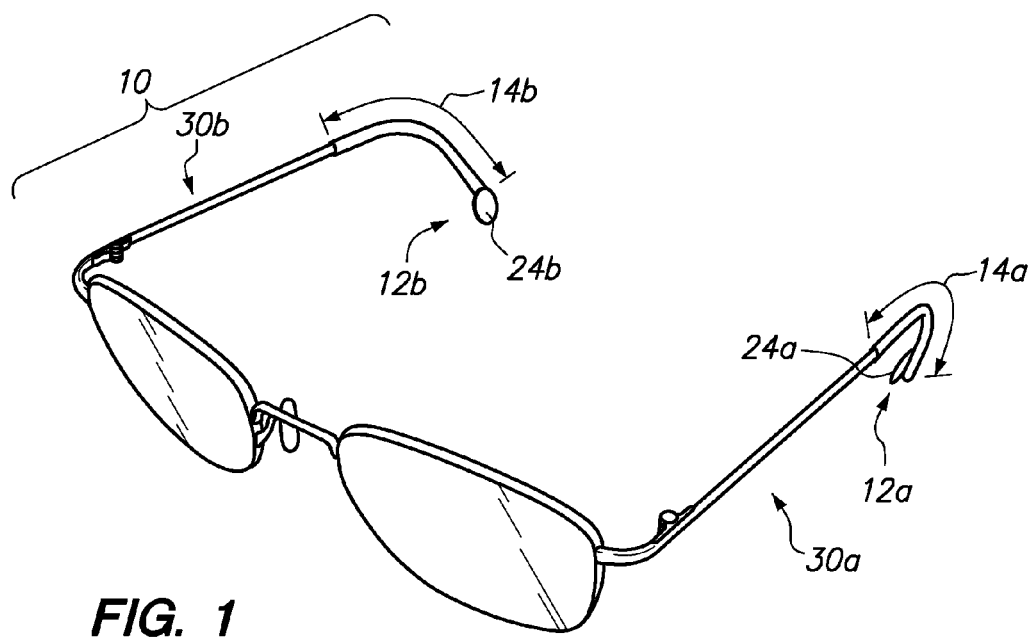
FIG. 1 is a perspective view of an eyeglass.

Referring now to FIG. 1, a perspective view of an eyeglass 10 is shown. The eyeglass 10 may have two extension discs 12a, b that may be attached to distal end portions of temple frame tips 14a, b. When the eyeglass 10 is worn by a wearer 16 in the use position (see FIG. 2), the extension discs 12a, b are positioned at depressions 18a, b (see FIG. 2A) above a mastoid process 20 (see FIG. 2) and behind the wearer's ear 22. The medial surfaces 24a, b (see FIG. 2A) of the left and right extensions discs 12a, b may be flat and contact the skin covering the depression 18. The friction between the medial surfaces 24a, b and the skin of the wearer at the depression 18 and the insertion of the extension discs 12a, b into the depressions 18 provide additional securement between the eyeglass 10 and the wearer when the eyeglass 10 is worn in the use position. The wearer is able to engage in active physical activities without dislodging his/her eyeglass 10.

The flat medial surfaces 24a, b of the extension discs 12a, b may be coated or covered with a friction material to facilitate frictional engagement with the skin of the wearer. By way of example and not limitation, the frictional material may be rubber, tacky adhesive, non skid pads, etc.

Figure 3:
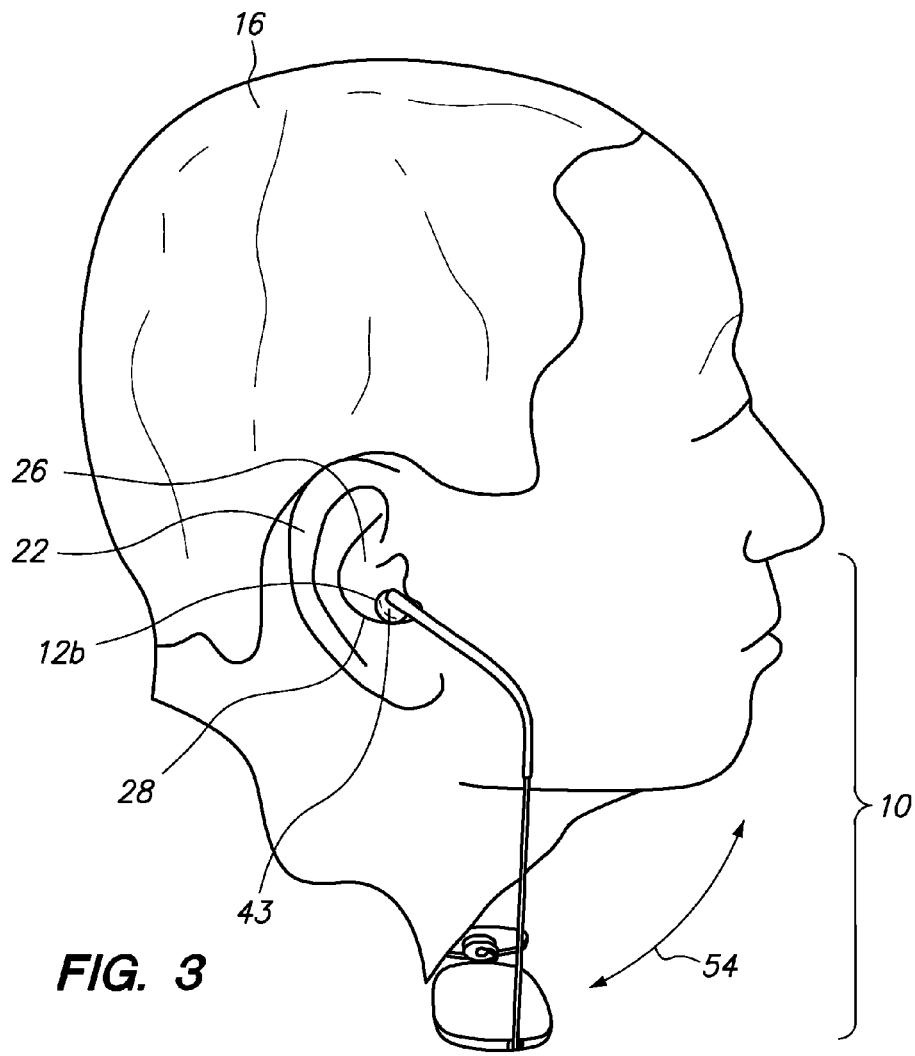
FIG. 3 is a side view of the person with the eyeglass in a storage position.

For those times when the eyeglass 10 is temporarily not needed, the eyeglass 10 may be hung on the ear 22/auditory canal 26 of the wearer 16, as shown in FIG. 3. The extension discs 12a, b may be placed in a bowl 28. The extension discs 12a, b hook onto the bowl 28 of the ear 22 to provide temporary storage of the eyeglass 10 when not in the use position.

Accordingly, the extension discs 12a, b inconspicuously facilitates retainment of the eyeglass 10 on the wearer's face in the use position as well as provide a convenient means of temporarily storing the eyeglass 10 when not in the use position (i.e., storage position).

Figure 4:
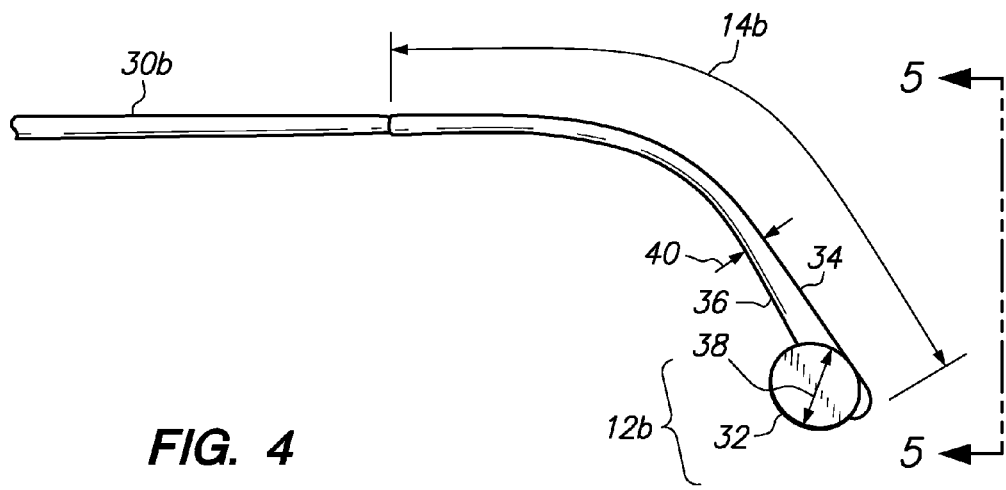
FIG. 4 is a side view of a temple frame of the eyeglass shown in FIG. 1.
Figure 5:
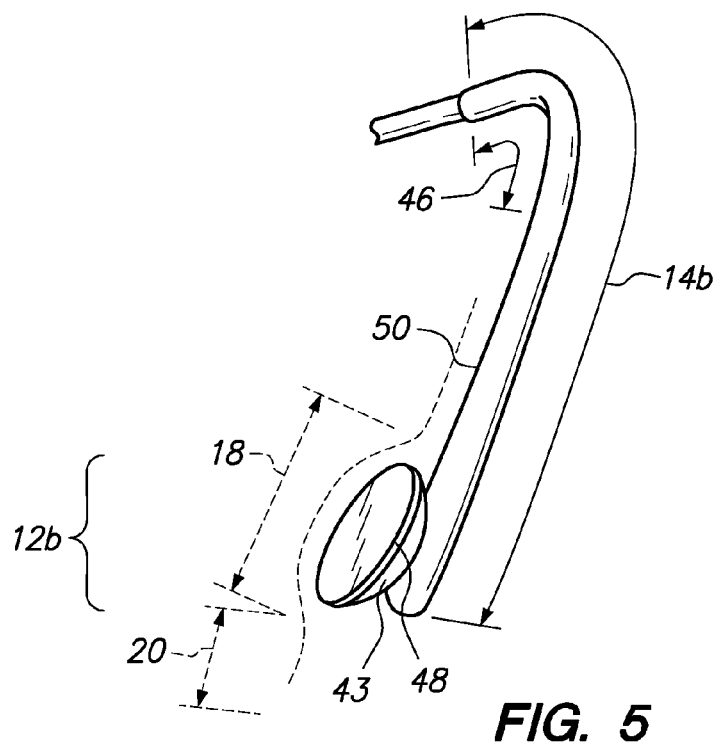
FIG. 5 is a rear view of the temple frame shown in FIG. 4.
Figure 6:
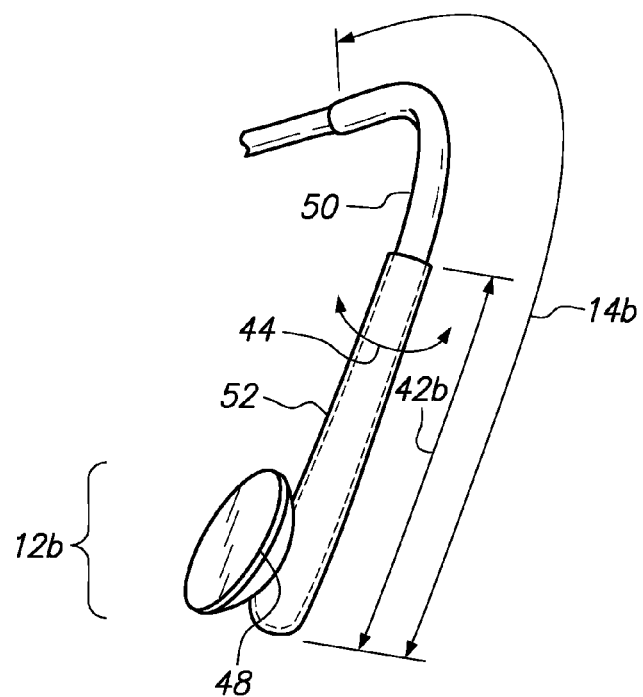
FIG. 6 is an alternate embodiment of the eyeglass shown in FIG. 5.

More particularly, referring now to FIG. 1, the eyeglass 10 may have left and right temple frames 30a, b. The temple frames 30a, b extend back toward the wearer's ear 22 between the ear 22 and the wearer's skull. (See FIG. 2). The temple frames 30a, b may have temple frame tips 14a, b that are disposed over the distal end portion of the temple frames 30a, b, as shown in FIG. 4. The extension discs 12a, b may have a circular shape defining an outer periphery 32 (see FIG. 4). The outer periphery 32 may be aligned to an upper edge 34 of the temple frame tips 14a, b so that the outer periphery 32 extends beyond the lower edge 36 of the temple frame tips 14a, b. Accordingly, an outer diameter 38 is greater than a thickness 40 of the temple frame tips 14a, b. Referring now to FIG. 5, the extension discs 12a, b may be attached to the temple frame tips 14a, b by way of adhesive, sonic welding, etc. and other means known in the art or developed in the future. Additionally, the extension discs 12a, b may be formed as a unitary structure with the temple frame tips 14a, b when the temple frame tips 14a, b are molded. Alternatively, as shown in FIG. 6, a slip on end 42b may be slipped over the temple frame tip 14b as well as a corresponding slip on end may be slipped over the temple frame tip 14a. The extension discs 12a, b may be positioned on the slip on end 42 in the same manner that the extension discs 12a, b are positioned on the temple frame tips 14a, b discussed above. The slip on end 42 may be fabricated from an elastomeric material, plastic, heat moldable plastic, etc. to allow the slip on end 42a, b to be slipped over the temple frame tips 14a, b yet prevent inadvertent rotational movement in the direction of arrow 44 (see FIG. 6) once the slip on end 42a, b is mounted to the temple frame tips 14a, b.

Figure 2:
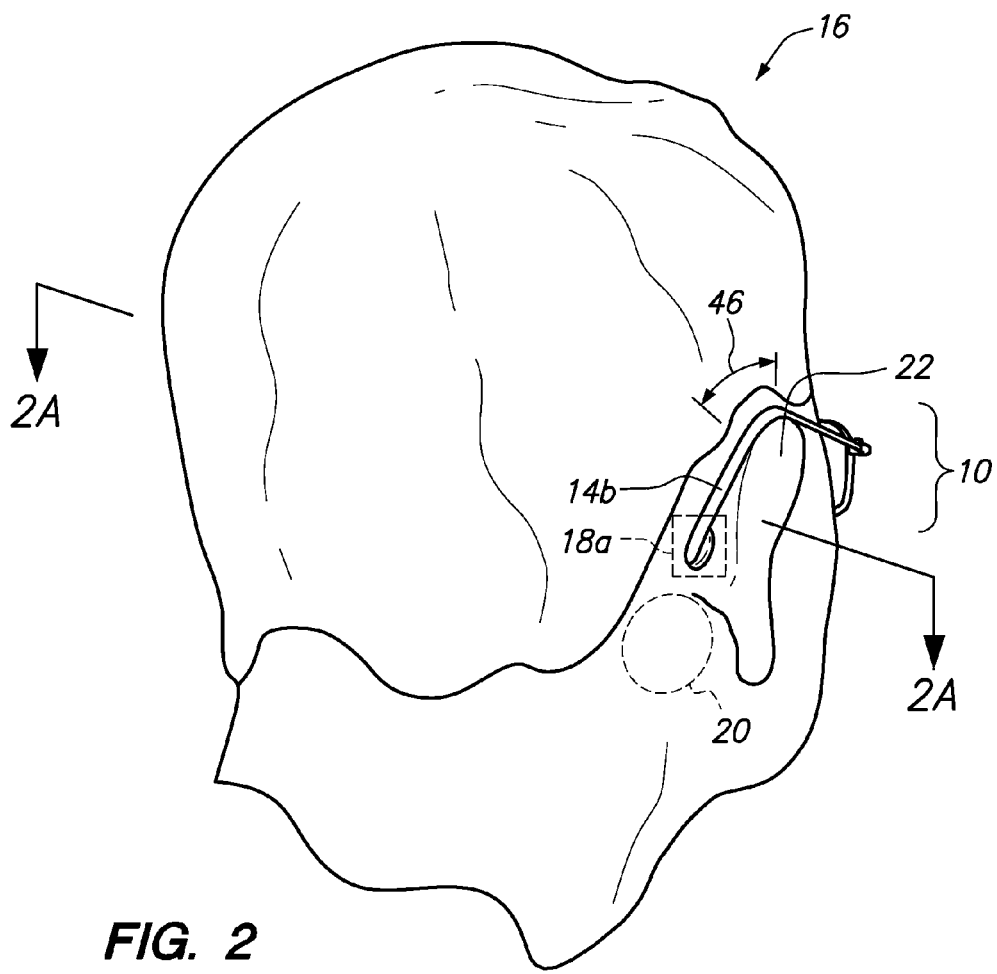
FIG. 2 is a rear view of a person wearing the eyeglass shown in FIG. 1.
Figure 2A:
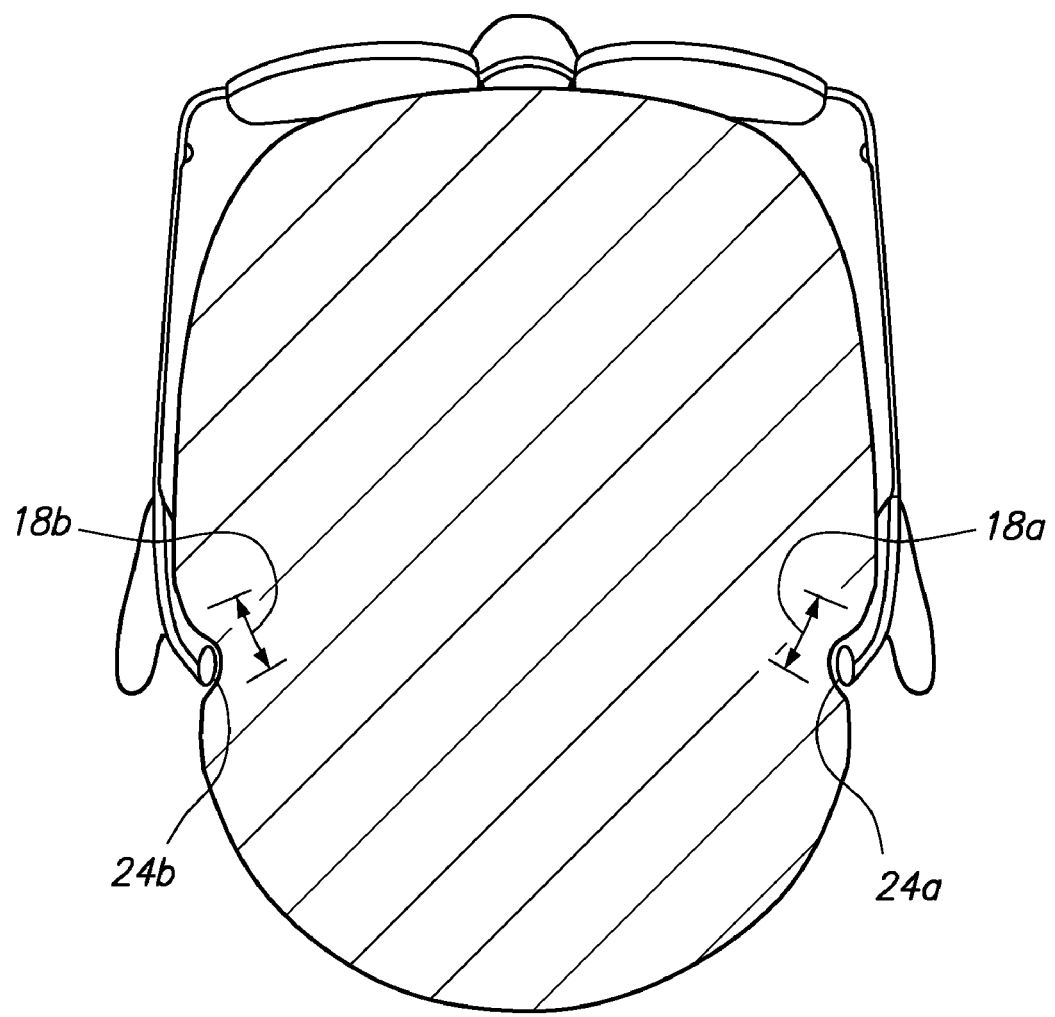
FIG. 2A is a cross sectional view of the person shown in FIG. 2 wearing the eyeglass.

Referring back to FIG. 5, the extension discs 12a, b may extend medially or inwardly from the distal end portion of the temple frame tips 14a, b. The extension discs 12a, b are received into the depressions 18 located behind the ear 22 of the wearer 16 and above the mastoid process 20 to facilitate retention of the eyeglass 10 when in the use position. As shown in FIG. 2, the eyeglass 10 is retained on the wearer 16 in the use position by the curvature 46 (see FIGS. 2 and 5) of the distal tips 14a, b that hooks behind the ear 22 of the wearer 16 and the extension discs 12a, b that are received into the depressions 18 behind the ear 22 and above the mastoid process 20. This facilitates retainment of the eyeglass 10 on the wearer 16 to allow the wearer 16 to engage in active physical activities which would otherwise dislodge the eyeglass 10 off of the wearer 16 during participation.

In the storage position shown in FIG. 3, the extension discs 12a, b may be disposed in the bowl 28 of the ear 22. As can be seen in FIGS. 5 and 6, the peripheral edge 48 of the extension discs 12a, b extend inward from the medial side 50 of the temple frame tips 14a, b or the medial side 52 of the slip on ends 42a, b. Also, the lateral side 43 (see FIGS. 3 and 5) of the extension discs 12a, b may have a dome shape. This allows the extension discs 12a, b to hook into the bowl 28 of the ear 22 when in the storage position shown in FIG. 3 facilitating firm retention even if the wearer 16 turns his/her head to the left or right. When the wearer 16 bends forward or bends backward, the round peripheral edge 48 (see FIG. 5) slides within the bowl 28 to allow the eyeglass 10 to pivot forward and rearward as shown by arrow 54 (see FIG. 3) while the extension discs 12a, b hook into the bowls 28 of the ears 22 of the wearer 16.

The extension discs 12a, b may be permanently attached to the temple frame tips 14a, b as an add on to existing eyeglass 10. Alternatively, the extension discs 12a, b may be formed as a unitary structure with the temple frame tips 14a, b. As a further alternative, slip on ends 42 may be used to retrofit existing eyeglasses. When an optometrist is dispensing the eyeglass, the optometrist may place the eyeglass 10 on the wearer 16 in the use position. The optometrist may bend the temple frame tips 14a, b until the extension discs 12a, b are positioned in the depressions 18 behind the ear 22 and above the mastoid process 20 of the wearer 16.

During use, the wearer 16 may decide to temporarily take off the eyeglass 10. By way of example and not limitation, if the eyeglass 10 is a reading glass, the wearer 16 may remove the reading glass 10 from the wearer's face when attempting to view long distances. The wearer 16 may be reading an article, newspaper, etc. When another individual interrupts the wearer 16, the wearer 16 may remove the eyeglass 10 or reading glass 10 and engage the second person in a face to face discussion. At this time, the wearer 16 may hook the eyeglass 10 to the ear 22 of the wearer 16 as shown in FIG. 3. In particular, the extension discs 12a, b are disposed within the bowls 28 of the ears 22 of the wearer 16. The wearer 16 may turn his/her head left or right and also bend forward and rearward without fear of dislodging the eyeglass 10.

The above description is given by way of example, and not limitation. Given the above disclosure, one skilled in the art could devise variations that are within the scope and spirit of the invention disclosed herein, including various ways of fabricating the extension discs. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An eyeglass for secure attachment to a wearer's head, the eyeglass comprising:
    a lens for protecting eyes of a wearer or improving vision of the wearer;
    left and right temple frames attached to opposed sides of the lens, the left and right temple frames extending rearwardly and disposable between the ear and a skull of the wearer; and
    left and right curved discs attached to distal end portions of the left and right temple frames, the left and right curved discs positionable at a slight depression covered by skin above a mastoid process of the wearer's head and behind the wearer's ear for securing the eyeglass to the wearer's head.

2. The eyeglass of claim 1 wherein outer peripheries of the curved discs are round.

3. The eyeglass of claim 2 wherein outer peripheries of the curved discs are lined up to upper edges of the distal end portions of the left and right temple frames.

4. The eyeglass of claim 1 wherein the curved discs have a lateral dome shape and a medial flat surface.

5. The eyeglass of claim 1 further comprising left and right slip-on temple frame ends, the left and right curved discs being formed as a unitary part of the slip-on temple frame ends.

6. A method of adjusting an eyeglass to a wearer, the method comprising the steps of:
    providing the eyeglass having:
        a lens for protecting eyes of a wearer or improving vision of the wearer;
        left and right temple frames attached to opposed sides of the lens, the left and right temple frames extending rearwardly and disposable between the ear and a skull of the wearer; and
        left and right curved discs attached to distal end portions of the left and right temple frames;
    disposing the eyeglass on a head of the wearer;
    bending the left and right temple frames until the left and right curved discs are positioned at a slight depression covered by skin above a mastoid process of the wearer's head and behind the wearer's ear.

7. The method of claim 6 wherein the providing step further comprises the step of attaching temple frame tips with unitary left and right curved discs to the distal end portions of the left and right temple frames.

8. The method of claim 6 wherein the providing step further comprises the step of attaching slip on ends with left and right curved discs to the left and right temple frame tips.

9. A method of securing an eyeglass to a head of a wearer when the eyeglass is not in use, the method comprising the steps of:
    providing the eyeglass having:
        a lens for protecting eyes of a wearer or improving vision of the wearer;
        left and right temple frames attached to opposed sides of the lens, the left and right temple frames extending rearwardly and disposable between the ear and a skull of the wearer; and
        left and right curved discs attached to distal end portions of the left and right temple frames;
    disposing the left and right curved discs within bowls of left and right ears of the wearer.

10. The method of claim 6 further comprising the step of sliding the left and right curved discs within the bowls of the left and right ears of the wearer as the wearer leans forward and backward.

\* \* \* \* \*